(12) United States Patent
Sharma et al.

(10) Patent No.: US 6,477,029 B1
(45) Date of Patent: Nov. 5, 2002

(54) DEFORMABLE MICRO-ACTUATOR

(75) Inventors: Ravi Sharma, Fairport, NY (US); Edward P. Furlani, Lancaster, NY (US); Milton S. Sales, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 121 days.

(21) Appl. No.: 09/671,438

(22) Filed: Sep. 27, 2000

(51) Int. Cl.[7] ................................................. H02N 2/00
(52) U.S. Cl. .......................................... 361/233; 347/68
(58) Field of Search ............................. 361/225, 230, 361/187, 207, 233; 337/139; 347/68; 430/50

(56) References Cited

U.S. PATENT DOCUMENTS

| | | | |
|---|---|---|---|
| 2,896,507 A | 7/1959 | Mast et al. | 359/292 |
| 3,716,359 A | 2/1973 | Sheridon | 430/19 |
| 4,065,308 A | 12/1977 | Bergen | 430/50 |
| 4,163,667 A | 8/1979 | Wysocki | 430/67 |
| 5,082,242 A * | 1/1992 | Bonne et al. | 251/129.01 |
| 5,495,280 A | 2/1996 | Gehner et al. | 347/358 |
| 5,739,832 A | 4/1998 | Heinzl et al. | 347/68 |
| 5,867,301 A | 2/1999 | Engle | 359/291 |

* cited by examiner

Primary Examiner—Ronald W. Leja
(74) Attorney, Agent, or Firm—Milton S. Sales

(57) ABSTRACT

A micro-actuator has a pair of conductive metallic layers connectable to an electrical potential source so as to induce a force between the metallic layers upon application of an electrical field. A layer of dense elastomer material is sandwiched between the pair of conductive metallic layers such that there will be a change in the volume of the elastomer material in response to relative movement between the conductive metallic layers. The elastomer material has at least one void within the elastomer material, whereby the micro-actuator exhibits void-enhanced growth and reduction in size in response to the effected force induced by the applied electrical field. At least one of the metallic layers is a flexible electrode plate. The other metallic layer may be rigid and essentially non-deformable. The elastomer material has substantial plurality of voids.

10 Claims, 1 Drawing Sheet

DEFORMABLE MICRO-ACTUATOR

FIELD OF THE INVENTION

This invention relates to micro-actuators usable to produce controlled movements.

BACKGROUND OF THE INVENTION

U.S. Pat. No. 2,896,507 describes an imaging member which includes an elastically deformable layer sandwiched between a pair of electrode plates. In operation, an electrical field is established across the deformable layer, thus causing this layer to deform. The deformation produces relative movement between the electrode plates. U.S. Pat. No. 3,716,359 discloses improved thin flexible metallic layer electrode plates comprising a plurality of different metals such as, for example, gold, indium, aluminum, silver, magnesium, copper, cobalt, iron, chromium, nickel, gallium, cadmium, mercury, and lead. Various techniques for forming the metallic layers on the elastomer layer are described including, for example, by vacuum evaporation. U.S. Pat. No. 4,163,667 describes the use of a composition of titanium and silver for use as the flexible conductive metallic layer electrode plates in imaging members.

It has been found that using solid elastomer material for the elastically deformable layer does not produce a significant amount of relative movement between the pair of electrode plates in response to the application of a reasonable electrical field because there is very little change in the volume of the elastomer. According to a feature of the present invention, the provision of a significant amount of free space or voids in the elastically deformable layer increases the relative motion of the pair of electrode plates.

DISCLOSURE OF THE INVENTION

It is an object of the present invention to provide a deformable micro-actuator of an elastomer material that produces a significant amount of relative movement between the pair of electrode plates in response to the application of a reasonable electrical field.

It is another object of the present invention to provide a deformable micro-actuator of an elastomer material having a significant amount of free space or voids in the elastomer material such that a significant amount of relative movement between the pair of electrode plates is produced in response to the application of a reasonable electrical field.

According to a feature of the present invention, a micro-actuator has a pair of conductive metallic layers connectable to an electrical potential source so as to induce a force between the metallic layers upon application of an electrical field. A layer of dense elastomer material is sandwiched between the pair of conductive metallic layers such that there will be a change in the volume of the elastomer material in response to relative movement between the conductive metallic layers. The elastomer material has at least one void within the elastomer material, whereby the micro-actuator exhibits void-enhanced growth and reduction in size in response to the effected force induced by the applied electrical field.

In a preferred embodiment of the present invention at least one of the metallic layers is a flexible electrode plate. The other metallic layer may be rigid and essentially non-deformable. The elastomer material has substantial plurality of voids.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
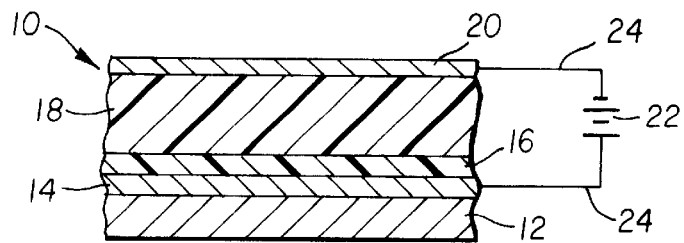
FIG. 1 is a partially schematic, cross-sectional view of a micro-actuator according to the present invention.
Figure 2:
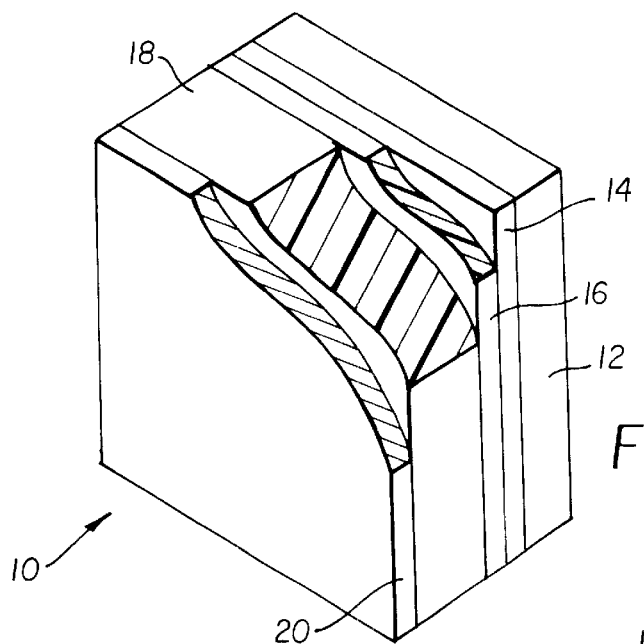
FIG. 2 is a perspective view of the micro-actuator of FIG. 1.

Referring to FIG. 1, there is shown in partially schematic, cross-sectional view, a micro-actuator 10. FIG. 2 is a perspective view of the micro-actuator of FIG. 1 with portions of the figure cut away for clarity. Micro-actuator 10 includes an optional support substrate 12, a thin, flexible conductive layer first electrode plate 14, and an optional layer of insulating material 16. Insulating material 16, in turn, carries a deformable elastomer layer 18.

Overlying elastomer layer 18 (FIGS. 1 and 2) or 18' (FIG. 1) is a rigid, essentially non-deformable conductive metallic second electrode plate 20. First and second electrode plates 14 and 20, respectively, are connected to an electrical potential source 22 by leads 24. Potential source 22 may be A.C., D.C., or a combination thereof. The potential source may also include suitable switching apparatus, not shown. Conductive layer first electrode plate 14 may be formed as a rigid, essentially non-deformable conductive metallic plate, eliminating the need for support substrate 12. Similarly, second electrode plate 20 may be formed as a thin, flexible conductive layer on a support substrate, not shown.

Figure 3:
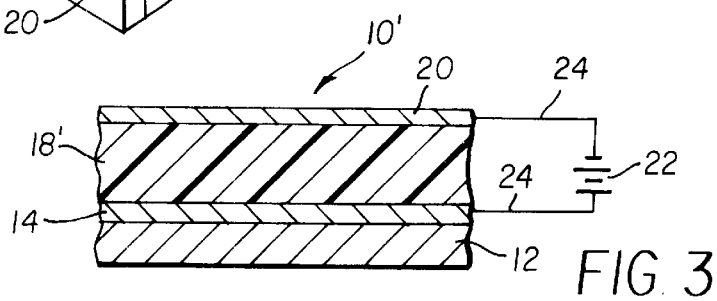
FIG. 3 is a partially schematic, cross-sectional view of a micro-actuator according to a second embodiment of the present invention.

In another embodiment shown in FIG. 3, a micro-actuator 10' incorporates insulating material in a deformable elastomer layer 18'. Thus the need for layer 16 of FIGS. 1 and 2 is obviated.

In operation, an electric field is established across deformable elastomer layer 18 (FIGS. 1 and 2) or 18' (FIG. 3) in a direction normal the planes of first and second electrode plates 14 and 20 by applying a potential from source 22 to the electrode plates. The mechanical force of attraction between first and second electrode plates 14 and 20 due to the electric field causes deformable elastomer layer to compress. Of course, first and second electrode plates 14 and 20 will repulse and cause the elastomer layer to deform in expansion if like electrical poles are applied to electrode plates 14 and 20.

Deformable elastomer layer 18 may comprise any suitable elastomer material, such as for example natural rubber or synthetic polymers with rubber-like characteristics (silicone rubber, styrenebutadiene, polybutadiene, neoprene, butyl, polyisoprene, nitrile, urethane, and ethylene rubbers). Elastomers having relatively high dielectric strength will allow the devices to be operated at higher voltage levels, which in many instances may be preferred.

Suitable selection of a particular elastomer material which exhibits an elastic modulus appropriate for a predetermined intended use is within ordinary skill given the description herein. For example, a relatively more stiff elastomer will typically recover more rapidly when an electric field is removed. On the other hand, an elastomer material having a relatively low elastic modulus is typically capable of greater deformations for a given value of electric field.

Figure 4:
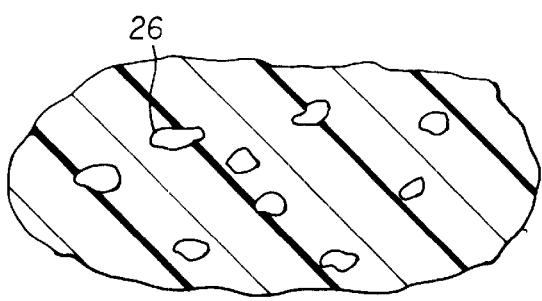
FIG. 4 is an enlarged view of a portion of the micro-actuators of FIGS. 1–3.

It has been found that using solid elastomer material for deformable elastomer layer 18 or 18' does not produce a significant amount of relative movement between electrode plates 14 and 20 for a reasonable amount of force because there is very little change in the volume of the elastomer. According to a feature of the present invention, the addition of a significant amount of free space, referred to herein as voids 26 (FIG. 4) in deformable elastomer layer 18 increases the relative motion of first and second elastomer. Voids 26 are filled with air.

The voids give rise to effective values for the Young's modulus $E_{eff}$ and permittivity $\in_{eff}$ of deformable elastomer layer 18 or 18'. To first order, these effective values are obtained via a simple volumetric weighting of the respective values of the void and the portion of fully dense solid elastomer. Specifically, the effective values are given by $$E_{eff} = E(1-\beta) \quad (1)$$

and $$\in_{eff} = \in_0 \beta + \in(1-\beta) \quad (2)$$

where $E$ and $\in$ are the Young's modulus and the permittivity of the solid elastomer, respectively, and $$\beta = \frac{\Delta V_{void}}{V_{tot}}$$

where $\Delta V_{void}$ is the volume occupied by the voids and $V_{tot}$ is the total volume occupied by deformable elastomer layer 18 or 18' in its undeformed state. For practical applications, $\Delta V_{void}$ is limited to approximately 25% of the total volume. Therefore, $0 < \beta < 0.25$.

It suffices to perform the analysis with optional layer 16 absent. When a voltage is applied between electrode plates 14 and 20, a strain develops in the deformable elastomer layer which is given by $$\frac{\Delta t}{t_0} = \frac{1}{E_{eff}} \frac{F_e(\Delta t)}{A} \quad (3)$$

where $t_0$ is the undeformed thickness of deformable layer 18 or 18', $\Delta t$ is the deformation, $A$ is the area of electrode plate 14, and $F_e$ is the electrostatic force of attraction between electrode plates 14 and 20. Furthermore, $$F_e(\Delta t) = -\frac{1}{2} \frac{\varepsilon_{eff} A V_0^2}{2(t-|\Delta t|)^2} \quad (4)$$

where $|\Delta t|$ is the absolute value of $\Delta t$ and $V_0$ is the voltage applied between electrode plates 14 and 20. An expression for the strain is obtained by substituting equations (1), (2) and (4) into (3), $$\frac{\Delta t}{t_0} = -\frac{1}{2} \frac{1}{E_{eff}} \frac{\varepsilon_{eff} V_0^2}{(t-|\Delta t|)^2} \quad (5)$$

$$= -\frac{1}{2} \frac{1}{E(1-\beta)} \frac{[\varepsilon_0 \beta + \varepsilon(1-\beta)]V_0^2}{(t-|\Delta t|)^2}$$

-continued $$= -\frac{1}{2} \frac{1}{E} \frac{\varepsilon V_0^2}{(t-|\Delta t|)^2} - \frac{1}{2} \frac{1}{E(1-\beta)(t-|\Delta t|)^2}$$

The strain is negative indicating a compressive deformation. The first term in equation (5) is the strain due to a fully dense solid elastomer (without voids). Thus, the additional deformation due to the voids is $$\Delta t_{void} = -\frac{t_0}{2} \frac{1}{E(1-\beta)} \frac{\varepsilon_0 \beta V_0^2}{(t-|\Delta t|)^2},$$

which shows that the addition of voids increases the deformation and hence the relative motion of electrode plates 14 and 20.

For efficient operation of this system, the thickness $t_0$ of deformable elastomer layer 18 or 18' should be much smaller that either of the side dimensions of the area $A$ of electrode plate 14. Thus, for example, if electrode plate 14 has a square area of A=10,000 $\mu$m, the thickness to should be less than 10 $\mu$m.

It is instructive to estimate the voltage required to achieve a typical deformation. Consider a device in which the undeformed thickness of deformable elastomer layer 18 or 18' is $t_0$=10 $\mu$m. Using solid elastomer values of E=$10^4$ N/m$^2$ and $\in$=3 $\in_0$ where $\in_0$=8.85×$10^{-12}$ farad/m. It follows that a voltage of approximately $V_0$=27 volts produces a deformation of $\Delta t$=0.1 $\mu$m.

As an example, the thickness of deformable elastomer layer 18 or 18' may be in the range of from about 0.5 microns to about 200 microns, depending upon the dielectric properties of the elastomer.

Electrode plate 20 should have good lateral conductivity, excellent stability, and little internal stress; as well as being highly adherent to deformable elastomer layer 18 or 18'. Suitable materials for electrode plate 20 include gold, silver, chromium, nickel, aluminum, conducting polymer, etc. Electrode plate 20 may be formed such as by chemical reaction, precipitation from a solution, electrophoresis, electrolysis, electroless plating, vapor deposition and others. The thickness of electrode plate 20 may, for example, be in the range of from about 200 angstroms to about 5,000 angstroms depending upon any desired flexibility, and the requisite strength and conductivity.

It will be recognized that the number of voids, the size of the individual voids, and the total volume of the voids relative to the volume of elastically deformable elastomer layer 18 are variables selectable during the design of a particular system.

PARTS LIST 10 micro-actuator
12 support substrate
14 first electrode plate
16 insulating material
18 elastically deformable elastomer layer
20 second electrode plate
22 potential source
24 leads
26 voids

What is claimed is:
1. A micro-actuator comprising:
   a pair of conductive metallic layers connectable to an electrical potential source so as to induce a force between the metallic layers upon application of an electrical field; and a layer of dense elastomer material sandwiched between the pair of conductive metallic layers such that there will be a change in the volume of the elastomer material in response to relative movement between the conductive metallic layers, said dense elastomer material having at least one void within the elastomer material, whereby the micro-actuator exhibits void-enhanced growth and reduction in size in response to the effected force induced by the applied electrical field.

2. A micro-actuator as set forth in claim 1, wherein at least one of the metallic layers is a flexible electrode plate.

3. A micro-actuator as set forth in claim 2, wherein the other of the metallic layers is rigid and essentially non-deformable.

4. A micro-actuator as set forth in claim 1, wherein said elastomer material has substantial plurality of voids.

5. A micro-actuator as set forth in claim 1, further comprising a support layer integral with one of the conductive metallic layers to inhibit movement of said one conductive metallic layer upon inducement of the force between the metallic layers.

6. A micro-actuator as set forth in claim 1, wherein said elastomer material is electrically conductive, and further comprising a layer of electrically insulating material between at least one of the metallic layers and the elastomer material.

7. A micro-actuator as set forth in claim 1, wherein said elastomer material is a dielectric.

8. A micro-actuator as set forth in claim 1, wherein said elastomer material is natural rubber.

9. A micro-actuator as set forth in claim 1, wherein said elastomer material is synthetic polymer.

10. A micro-actuator as set forth in claim 1, wherein a total volume occupied by the voids is limited to approximately 25% of a total volume occupied by the layer of dense elastomer material.

* * * * *